(12) United States Patent
Hempstead et al.

(10) Patent No.: US 10,997,120 B2
(45) Date of Patent: May 4, 2021

(54) SYSTEMS AND METHODS FOR DEVICE VISITING FREQUENCY ESTIMATION

(71) Applicant: CISCO TECHNOLOGY, INC., San Jose, CA (US)

(72) Inventors: Zachary Hempstead, Berkeley, CA (US); Nathaniel Brahms, San Francisco, CA (US); Edmund Wong, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 305 days.

(21) Appl. No.: 15/460,525

(22) Filed: Mar. 16, 2017

(65) Prior Publication Data

US 2018/0267988 A1 Sep. 20, 2018

(51) Int. Cl.
 *G06F 16/00* (2019.01)
 *H04L 9/00* (2006.01)
 (Continued)

(52) U.S. Cl.
 CPC ........ *G06F 16/162* (2019.01); *G06F 16/2255* (2019.01); *G06F 16/2457* (2019.01);
 (Continued)

(58) Field of Classification Search
 CPC ...... G06Q 30/02; H04W 4/029; H04W 48/18; H04W 24/08; H04W 88/16; H04W 74/08;
 (Continued)

(56) References Cited

U.S. PATENT DOCUMENTS 7,823,156 B2 * 10/2010 Soules .................... G06F 3/067
 718/105
8,255,284 B1 * 8/2012 Ramalingam ......... H04W 4/029
 705/26.1
(Continued)

FOREIGN PATENT DOCUMENTS

EP      2 574 089 B1 *  4/2020
WO   WO 2012/174024 A1 * 12/2012
WO   WO 2016/060932 A1 *  4/2016

OTHER PUBLICATIONS

Fabrício Olivetti de França, A hash-based co-clustering algorithm for categorical data:, Expert Systems With Applications 64 (2016) 24-355.*

(Continued)

Primary Examiner — Srirama Channavajjala
(74) Attorney, Agent, or Firm — Polsinelli PC

(57) ABSTRACT

Disclosed are systems, methods, and computer-readable media for determining a distribution of various visiting frequencies among devices/elements detected at a site. A method includes generating a list representing a portion of devices detected at a site over a first time period based on wireless signals transmitted by the devices and received at an access point and determining a visiting frequency for each device represented in the list based on data representing devices previously detected at the site. The method further includes, based on the visiting frequency determined for each device represented in the list, estimating a distribution of each visiting frequency among the devices detected at the site over the first time period to yield a plurality of estimated distributions and storing the plurality of estimated distributions for further processing.

18 Claims, 7 Drawing Sheets

(51) Int. Cl.
*G06F 16/16* (2019.01)
*G06F 16/28* (2019.01)
*G06F 16/22* (2019.01)
*G06F 16/2458* (2019.01)
*G06F 16/2457* (2019.01)
*H04L 12/743* (2013.01)
*H04L 9/06* (2006.01)
*H04L 9/32* (2006.01)

(52) U.S. Cl.
CPC ........ *G06F 16/2477* (2019.01); *G06F 16/285* (2019.01); *H04L 9/0643* (2013.01); *H04L 9/3236* (2013.01); *H04L 9/3242* (2013.01); *H04L 45/7453* (2013.01); *H04L 2209/38* (2013.01); *H04L 2209/80* (2013.01)

(58) Field of Classification Search
CPC .. H04W 74/0816; H04W 64/00; H04L 47/14; H04L 5/0044; H04L 5/0007; H04L 5/0016; H04L 2209/80; H04L 2209/38; H04L 9/3236; H04L 45/7453; H04L 9/0643; H04L 9/3242; G06F 16/162; G06F 16/285; G06F 16/2255; G06F 16/2477; G06F 16/2457
See application file for complete search history.

(56) References Cited

U.S. PATENT DOCUMENTS

| | | | | |
|---|---|---|---|---|
| 8,447,032 | B1* | 5/2013 | Covell | G06F 16/9014 380/28 |
| 9,786,298 | B1* | 10/2017 | Greene | G10L 25/54 |
| 2004/0042432 | A1* | 3/2004 | Riazi | H04W 88/16 370/338 |
| 2004/0181788 | A1* | 9/2004 | Kester | G06Q 20/203 717/168 |
| 2004/0260694 | A1* | 12/2004 | Chaudhuri | G06F 16/215 |
| 2006/0005014 | A1* | 1/2006 | Aura | H04L 9/3236 713/162 |
| 2007/0033275 | A1* | 2/2007 | Toivonen | G06F 16/9562 709/224 |
| 2007/0279227 | A1* | 12/2007 | Juels | H04L 63/0492 340/572.1 |
| 2008/0198815 | A1* | 8/2008 | Liu | H04W 74/0816 370/336 |
| 2009/0098871 | A1* | 4/2009 | Gogic | H04W 48/18 455/435.1 |
| 2009/0193044 | A1* | 7/2009 | Buehrer | G06F 16/95 |
| 2010/0234016 | A1* | 9/2010 | Palanki | H04W 48/08 455/424 |
| 2011/0035284 | A1* | 2/2011 | Moshfeghi | G06Q 30/02 705/14.58 |
| 2011/0185059 | A1* | 7/2011 | Adnani | H04W 24/08 709/224 |
| 2011/0235908 | A1* | 9/2011 | Ke | G06F 16/5854 382/173 |
| 2012/0166401 | A1* | 6/2012 | Li | G06F 16/2246 707/692 |
| 2013/0137464 | A1* | 5/2013 | Kramer | G06Q 30/02 455/456.3 |
| 2013/0326230 | A1* | 12/2013 | Ciet | H04L 9/0643 713/189 |
| 2014/0032536 | A1* | 1/2014 | Agrawal | G06N 20/00 707/723 |
| 2014/0155086 | A1* | 6/2014 | Bhatia | G01S 5/0242 455/456.1 |
| 2014/0295858 | A1* | 10/2014 | Li | H04W 74/08 455/450 |
| 2014/0337375 | A1* | 11/2014 | Yue | G06F 16/2246 707/769 |
| 2014/0344195 | A1* | 11/2014 | Drew | G06F 16/35 707/737 |
| 2015/0016439 | A1* | 1/2015 | Zhou | H04M 1/2535 370/338 |
| 2015/0186464 | A1* | 7/2015 | Seputis | G06F 16/24545 707/718 |
| 2015/0282143 | A1* | 10/2015 | Kim | H04W 72/0406 370/329 |
| 2018/0324152 | A1* | 11/2018 | Jarchafjian | H04W 4/023 |

OTHER PUBLICATIONS

Jiaxin Ding et al., "MinHash Hierarchy for Privacy Preserving Trajectory Sensing and Query", 16th ACM/IEEE International Conference on Information Processing in Sensor Networks (IPSN), 2017, pp. 17-28.*

* cited by examiner

MH (MON)   | 1 | 4  | 20 | 35 | 42 |～670
MH (TUE)   | 1 | 35 | 36 | 42 | 45 |～672
MH (WED)   | 1 | 20 | 42 | 45 | 50 |～674
MH (THU)   | 1 | 35 | 42 | 50 | 56 |～676
MH (FRI)   | 1 | 4  | 20 | 45 | 56 |～678
MH (SAT)   | 1 | 20 | 35 | 42 | 45 |～680
MH (SUN)   | 20| 42 | 56 | 65 | 70 |～682

MH (MERGED) | 1 | 20 | 42 |～686

MH (MON) | 1 | 8 | 20 | 33 | 50 |～684

*FIG. 6A*

| MH (MON) | | | | | |
|---|---|---|---|---|---|
| 1 | 4 | 20 | 35 | 42 | ~670 |
| 1 | 3 | 5 | 1 | 1 | ~670-1 |

| MH (TUE) | | | | | |
|---|---|---|---|---|---|
| 1 | 35 | 36 | 42 | 45 | ~672 |
| 2 | 1 | 1 | 3 | 2 | ~672-1 |

| MH (WED) | | | | | |
|---|---|---|---|---|---|
| 1 | 20 | 42 | 45 | 50 | ~674 |
| 1 | 1 | 1 | 1 | 1 | ~674-1 |

| MH (THU) | | | | | |
|---|---|---|---|---|---|
| 1 | 35 | 42 | 50 | 56 | ~676 |
| 4 | 3 | 5 | 6 | 1 | ~676-1 |

| MH (FRI) | | | | | |
|---|---|---|---|---|---|
| 1 | 4 | 20 | 45 | 56 | ~678 |
| 3 | 2 | 2 | 2 | 3 | ~678-1 |

| MH (SAT) | | | | | |
|---|---|---|---|---|---|
| 1 | 20 | 35 | 42 | 45 | ~680 |
| 1 | 1 | 1 | 1 | 1 | ~680-1 |

| MH (SUN) | | | | | |
|---|---|---|---|---|---|
| 20 | 42 | 56 | 65 | 70 | ~682 |
| 3 | 4 | 1 | 2 | 3 | ~682-1 |

| MH (MERGED) | | |
|---|---|---|
| 1 | 20 | 42 | ~686 |
| 10 | 12 | 15 | ~686-1 |

| MH (MON) | | | | | |
|---|---|---|---|---|---|
| 1 | 8 | 20 | 33 | 50 | ~684 |
| 3 | 2 | 1 | 4 | 2 | ~684-1 |

FIG. 6B

SYSTEMS AND METHODS FOR DEVICE VISITING FREQUENCY ESTIMATION

TECHNICAL FIELD

The present technology pertains to determining a distribution of various visiting frequencies among devices/elements detected at a site.

BACKGROUND

With the ever growing presence of electronic devices in people's lives, providers of consumer services and products have increased their reliance on such electronic devices to more effectively identify their customers and tailor advertisements, promotions, sales, discounts, etc., in order to optimize sales/revenues. One example parameter that might be of value to providers of goods and services is how frequently a consumer visits a provider's site (physical site or virtual (online)). As a business grows, more and more consumers visit the business's locations/sites. As the number of consumers/visitors increases, determining a visiting frequency for all consumers can become cumbersome and difficult to keep track of. Moreover, determining a distribution of devices having a particular visiting frequency is also challenging.

Currently utilized methods to determine a visiting frequency for consumers detected at a given location and/or a distribution of various visiting frequencies among detected devices at such location, involve storing data of all detected devices up to a certain point in time and then determining the intended visiting frequency/distribution of visiting frequencies by parsing through all the stored data. Such methods become costly and time consuming as the number of consumers/visitors increases and larger and larger storage devices are required to store devices' data and more time would be needed to comb through all the stored data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 6A-B provide examples of implementing the method of FIG. 5, according to an aspect of the present disclosure.

DESCRIPTION OF EXAMPLE EMBODIMENTS

Figure 1:
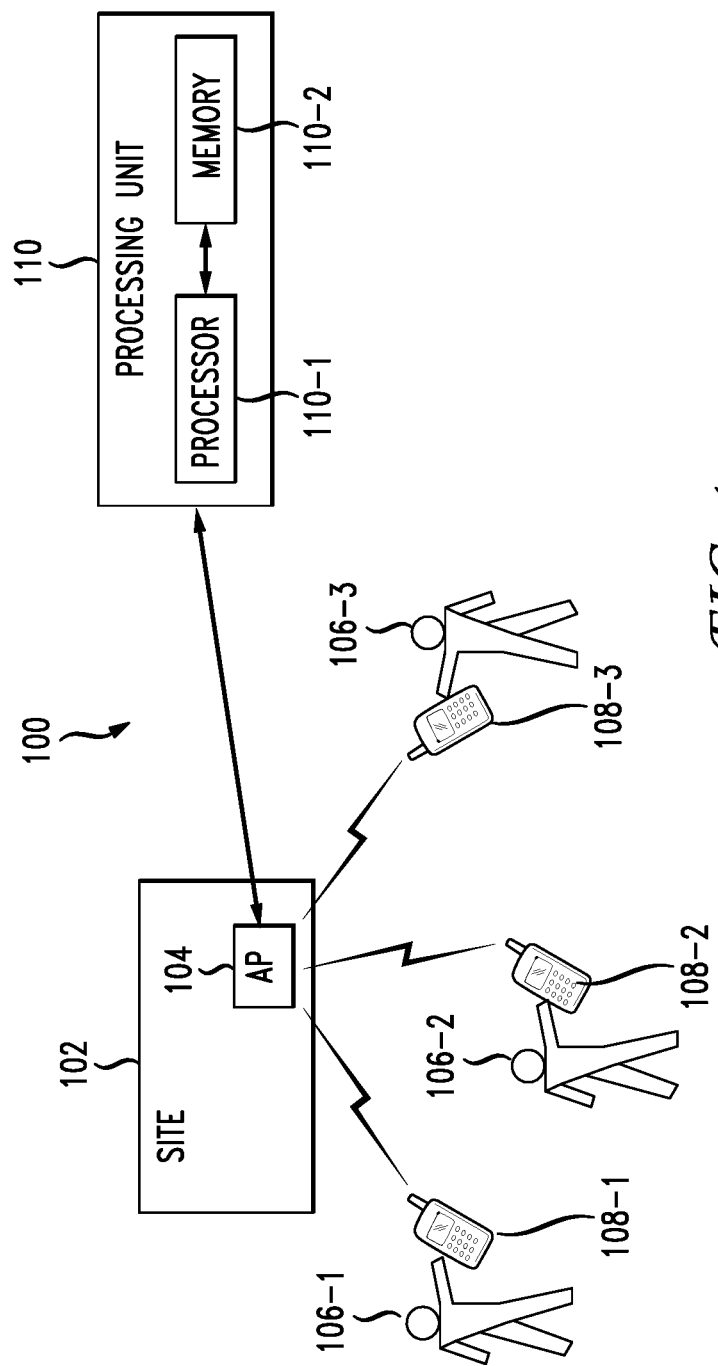
FIG. 1 illustrates a setting in which systems and methods of the present application can be utilized, according to an aspect of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

Disclosed are systems, methods, and computer-readable media for determining a distribution of various visiting frequencies among devices/elements detected at a site.

A method includes generating a list representing a portion of devices detected at a site over a first time period based on wireless signals transmitted by the devices and received at an access point and determining a visiting frequency for each device represented in the list based on data representing devices previously detected at the site. The method further includes, based on the visiting frequency determined for each device represented in the list, estimating a distribution of each visiting frequency among the devices detected at the site over the first time period to yield a plurality of estimated distributions and storing the plurality of estimated distributions for further processing.

A device includes a memory having computer-readable instructions stored therein, and one or more processors. The one or more processors are configured to execute the computer-readable instructions to generate a list representing a portion of devices detected at a site over a first time period based on data representing devices previously detected at the site, and determine a visiting frequency for each device represented in the list based on data representing devices previously detected at the site. The processor is further configured to, based on the visiting frequency determined for each device represented in the list, estimate a distribution of each visiting frequency among the devices detected at the site over the first time period to yield a plurality of estimated distributions, and store the plurality of estimated distributions for further processing.

A non-transitory computer-readable medium includes computer-readable instructions, which when executed by a processor, cause the processor to perform functions including generating a list representing a portion of devices detected at a site over a current time period based on data representing devices previously detected at the site, and associating each device represented in the list with a visiting frequency to yield at least one associated visiting frequency, the associating being based on a table having a plurality of categories corresponding to a plurality of visiting frequencies. The execution of the computer-readable instructions further causes the processor to perform functions including determining a distribution of each of the plurality of visiting frequencies among the devices detected at the site over the current time period, based on the at least one associated visiting frequency.

2. Description

The disclosed technology addresses the need in the art for reducing the amount of storage needed to store all data collected on all devices detected at a particular site or location in order to determine visiting frequencies of each device and subsequently a distribution of various visiting frequencies among all devices. Inventive concepts described herein provide an improved system, which provide an estimate of a proportion (percentage) of devices having a particular visiting frequency that are detected at a given location of interest (site) over a given time period. In performing this estimation, significantly fewer amount of data corresponding to detected devices are stored and utilized. The approaches herein avoid having to store the raw data of all devices up to a point of time (e.g., up to a week, a month, a year, etc.) in order to determine the intended visiting frequencies of the detected devices and/or a distribution of each visiting frequency among the detected devices at the site over the given time period.

As will be described below, a modified version of minimum hash (or minhash (MH)) functions can be utilized to eliminate the need for storing raw data of all devices up to the certain period in time. As will be described, given a minimum visiting frequency of interest (e.g., hourly or daily), a system has to only maintain the raw data of detected devices over a current time period corresponding to the minimum visiting frequency. Thereafter, the system utilizes the generated MHs to determine a distribution of each visiting frequency among all devices detected at the site over the current time period.

Prior to describing various examples of inventive concepts, some parameters are defined. A minimum time period of interest (a first time period) is defined as the shortest time period over which an entity may be interested in determining a distribution of various visiting frequencies among all devices detected at a site. For example, the minimum time period of interest may be one hour, a day, etc. Throughout the disclosure, one hour or one day may be used as examples of a minimum time period of interest. However, other minimum time periods of interest are also contemplated and within the scope of coverage of the present application (e.g., a minimum time period of interest of 4 hours, a fraction of an hour, a few days, etc.).

Additional time periods are defined as each having a duration longer than a preceding time period. For example, if the minimum time period of interest is an hour, additional time periods can include a day (24 hours), a week (7 days), a month (4 weeks), a quarter (3 months), semi-annual (6 months), annual (12 months), etc. If the minimum time period of interest is a day (24 hours), additional time periods can include a week (7 days), a month (4 weeks), a quarter (3 months), semi-annual (6 months), annual (12 months), etc.

Visiting frequencies associated with defined time periods include, for example, an hourly visiting frequency, a daily visiting frequency, a weekly visiting frequency, a monthly visiting frequency, a quarterly visiting frequency, an occasional (semi-annual) visiting frequency, an annual visiting frequency, a first timer visiting frequency, etc.

Each visiting frequency has a qualifying condition associated therewith, which is met by a device for the device to be associated with a visiting frequency. Examples of various qualifying conditions are as follows. In order for a device to be associated with an hourly visiting frequency, the device must be detected at a site in a minimum of two one-hour time periods out of the last 5 one-hour time periods. In order for a device to be associated with a daily visiting frequency, the device must be detected at the site in a minimum of 4 one-day (24 hours) time periods out of the last 7 one-day (24 hours) time periods. In order for a device to be associated with a weekly visiting frequency, the device must be detected at the site in a minimum of two one-week (7 days) time periods out of the last 4 one-week (7 days) time periods. In order for a device to be associated with a monthly visiting frequency, the device must be detected at the site in a minimum of two one-month (4 weeks) time periods out of the last 4 one-month (4 weeks) time periods, etc. Similar qualifying conditions may be defined for other time periods (e.g., quarterly, semi-annual, annual, etc.).

While various examples of time periods, durations of each defined time period, visiting frequencies and qualifying conditions of each visiting frequency are provided above, inventive concepts are not limited thereto and various different time periods, duration of each time period, visiting frequencies and qualifying conditions are contemplated and within the scope of coverage of the present application.

FIG. 1 illustrates an example setting in which systems and methods of the present application can be utilized, according to an aspect of this disclosure.

As shown in FIG. 1, a setting 100 includes a site 102. Site 102 can be any location that may be frequented by individuals, customers, observers, tourists, etc. (hereinafter, collectively referred to as visitors, where a visitor can be used to denote a visitor's associated electronic device (visiting electronic device, for example)). For example, site 102 can be a store, a car dealership, a museum, a historical site, etc. Furthermore, site 102 can be a virtual site such as a website, an online store, etc., that can be visited online by one or more visitors (in the context of virtual site, a visitor can be a visiting electronic device or a visitor identified by a username or a user identification). Site 102 can have one or more access points (APs) 104 associated therewith. While FIG. 1 illustrates site 102 as having a single AP 104, the instant disclosure is not limited to a single AP 104 at a site 102. For example, site 102 can have two or more APs 104 installed in association therewith. Furthermore, when site 102 is a virtual site (e.g., a website), setting 100 may no longer have AP 104 associated therewith.

Setting 100 further includes one or more visitors 106-1 to 106-3. Each of visitors 106-1 to 106-3 can have an electronic device 108-1 to 108-3 associated therewith. While FIG. 1 illustrates three visitors 106-1 to 106-3, the instant disclosure is not limited to three visitors and any number of visitors, each with a corresponding electronic device, can be present in setting 100. Each of electronic devices 108-1 to 108-3 can be a handheld electronic device, including but not limited to, a mobile phone, a personal digital assistant (PDA), a laptop, a tablet, a pager, a sensor, a personal smart device (e.g., a smart watch or smart glasses), etc. In one example, each electronic device 108-1 to 108-3 has wireless communication capabilities so as to enable electronic device 108-1 to 108-3 to pick up wireless signals, such as wireless signals from nearby available wireless access points, that enable electronic device 108-1 to 108-3 to establish a wireless communication session, according to any known or to be developed wireless communication standard, to a network such as the Internet.

AP 104 has a range, such that when any of electronic devices 108-1 to 108-3 are present within the range, a notification is provided by AP 104 to electronic device 108-1, 108-2 or 108-3 that access to the Internet via AP 104 is available. In some examples, a device is detected by an AP when AP 104 provides a notification to the electronic device that a connection to Internet is available via AP 104. AP 104 can have a processor and memory that stores computer-readable instructions, which when executed by the processor inside AP 104, enables AP 104 to perform functions including, but not limited to, detecting a presence of electronic devices through reception of wireless signals from electronic devices within the range of AP 104, enabling connection between one or more of the detected device and the Internet, etc.

Setting 100 further includes a remote processing system 110. Remote processing system 110 can communicate with AP 104 via any known or to be developed wired and/or wireless communication technology. As will be further described below, whenever AP 104 detects an electronic device within the corresponding range of AP 104, AP 104 transmits raw data of the detected electronic device to processing system 110. The raw data may including various types of identifiers of the detected electronic device including, but not limited to, a MAC address, a model identifier, a manufacturer identifier, etc., of the detected electronic device.

Processing system 110 has a processor 110-1 and a memory 110-2 associated therewith. Processor 110-1 and memory 110-2 of processing system 110 are utilized to performed functionalities as described below with reference to FIGS. 3-5. Alternatively, processing system 110 can have more than one processor, where each processor is configured to execute computer-readable instructions to carry out (implement) a specific set of tasks/functionalities. For example, one process can execute computer-readable instructions to communicate with AP 104 (or two or more APs), while another processor can implement instructions to determining visiting frequencies, distribution of visiting frequencies, etc.

While FIG. 1 illustrates specific numbers of sites, APs, visitors, associated electronic devices, processing systems, etc., inventive concepts are not limited thereto and any number of sites, APs, visitors, associated electronic devices, processing systems, etc., are contemplated to be within the scope of the present disclosure.

Figure 2:
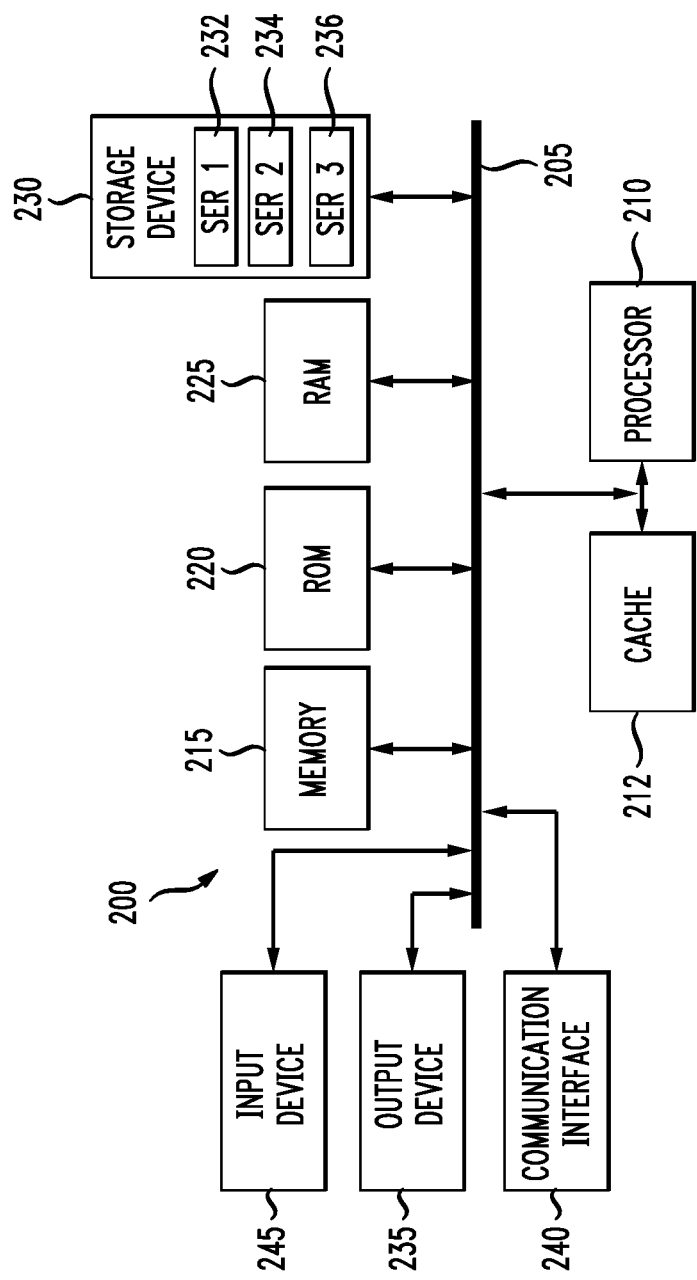
FIG. 2 illustrates the basic computing components of a computing device such as processing system shown in FIG. 1, according to an aspect of this disclosure.

The disclosure now turns to FIG. 2 which illustrates the example computing components of a computing device such as processing system 110 and/or electronic devices 108-1 to 108-3 shown in FIG. 1, according to an aspect of this disclosure. With reference to FIG. 2, an exemplary system and/or computing device 200 includes a processing unit (CPU or processor) 210 and a system connector 205 that couples various system components including the system memory 215 such as read only memory (ROM) 220 and random access memory (RAM) 225 to the processor 210. The system 200 can include a cache 212 of high-speed memory connected directly with, in close proximity to, or integrated as part of the processor 210. The system 200 copies data from the memory 215, 220, and/or 225 and/or the storage device 230 to the cache 212 for quick access by the processor 210. In this way, the cache provides a performance boost that avoids processor 210 delays while waiting for data. These and other services can control or be configured to control the processor 210 to perform various operations or actions. Other system memory 215 may be available for use as well. The memory 215 can include multiple different types of memory with different performance characteristics. It can be appreciated that the disclosure may operate on a computing device 200 with more than one processor 210 or on a group or cluster of computing devices networked together to provide greater processing capability. The processor 210 can include any general purpose processor and a hardware service or software service, such as service 1 232, service 2 234, and service 3 236 stored in storage device 230, configured to control the processor 210 as well as a special-purpose processor where software instructions are incorporated into the processor. The processor 210 may be a self-contained computing system, containing multiple cores or processors, a connector, memory controller, cache, etc. A multi-core processor may be symmetric or asymmetric. The processor 210 can include multiple processors, such as a system having multiple, physically separate processors in different sockets, or a system having multiple processor cores on a single physical chip. Similarly, the processor 210 can include multiple distributed processors located in multiple separate computing devices, but working together such as via a communications network. Multiple processors or processor cores can share resources such as memory 215 or the cache 212, or can operate using independent resources. The processor 210 can include one or more of a state machine, an application specific integrated circuit (ASIC), or a programmable gate array (PGA) including a field PGA.

The system connector 205 may be any of several types of connector structures including a memory connector or memory controller, a peripheral connector, and a local connector using any of a variety of connector architectures. A basic input/output system (BIOS) stored in ROM 220 or the like, may provide the basic routine that helps to transfer information between elements within the computing device 200, such as during start-up. The computing device 200 further includes storage devices 230 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 230 is connected to the system connector 205 by a drive interface. The drives and the associated computer-readable storage devices provide nonvolatile storage of computer-readable instructions, data structures, program services and other data for the computing device 200. In one aspect, a hardware service that performs a particular function includes the software component stored in a tangible computer-readable storage device in connection with the necessary hardware components, such as the processor 210, connector 205, an output device such as a display 235, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 200 is a small, handheld computing device, a desktop computer, or a computer processing unit. When the processor 210 executes instructions to perform "operations", the processor w10 can perform the operations directly and/or facilitate, direct, or cooperate with another device or component to perform the operations.

Although the exemplary embodiment(s) described herein employs a storage device such as a hard disk 230, other types of computer-readable storage devices which can store data that are accessible by a computer, such as magnetic cassettes, flash memory cards, digital versatile disks (DVDs), cartridges, random access memories (RAMs) 225, read only memory (ROM) 220, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

Optionally, to enable user interaction with the computing device 200, an input device 245 represents any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems enable a user to provide multiple types of input to communicate with the computing device 200. The communications interface 240 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 210. The functions these blocks represent may be provided through the use of either shared or dedicated hardware, including, but not limited to, hardware capable of executing software and hardware, such as a processor 210, that is purpose-built to operate as an equivalent to software executing on a general purpose processor. For example, the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 220 for storing software performing the operations described below, and random access memory (RAM) 225 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine services or program engines within the programmable circuits. The system 200 shown in FIG. 2 can practice all or part of the recited methods, can be a part of the recited systems, and/or can operate according to instructions in the recited tangible computer-readable storage devices. Such logical operations can be implemented as services configured to control the processor 110 to perform particular functions according to the programming of the service. For example, FIG. 2 illustrates three services SER1 232, SER2 234 and SER3 236 which are services configured to control the processor 210. These services may be stored on the storage device 230 and loaded into RAM 225 or memory 215 at runtime or may be stored in other computer-readable memory locations.

One or more parts of the example computing device 200, up to and including the entire computing device 200, can be virtualized. For example, a virtual processor can be a software object that executes a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 210 can include all types of processors disclosed herein, including a virtual processor. However, when referring to a virtual processor, the processor 210 includes the software components associated with executing the virtual processor in a virtualization layer and underlying hardware necessary to execute the virtualization layer. The system 200 can include a physical or virtual processor 210 that receive instructions stored in a computer-readable storage device, which cause the processor 210 to perform certain operations. When referring to a virtual processor 210, the system also includes the underlying physical hardware executing the virtual processor 210.

As mentioned above, the technologies herein can implement a modified version of minhash (MH) functions. A MH of a set of elements is formed by processing the set of elements using an arbitrary hash function. Having determined all the hash values of all the members, then the k smallest hash values are stored for some positive value of k (e.g., k can be any positive number greater than 0).

Alternatively, a technique may be used in which instead of storing the k smallest hash value from among all hash values generated using a single hash function, the smallest hash value generated by each of k different hash functions is selected and compiled to generate the resulting minhash.

Furthermore, minhashes of two different sets of elements may be merged together, which would be the same as if a minhash of a union of the elements in the two different sets is determined.

One useful property of minhashes is that a minhash of one set (set A) and a minhash of another set (set B) allows for estimation of a fraction of the elements in the union of sets A and B that are present in the intersection of elements in sets A and B. In other words, minhashes are useful to determine an estimate of the number of elements that are common between two or more different sets. The accuracy of this estimation increases as the value of k increases.

In the context of the present application, the concept of minhash functions is applied as follows. For ease of discussion, the generation of a minhash for detected devices is described with reference to FIG. 3. Thereafter, the generation of a table of minhashes is described with reference to FIG. 4, against which each generated minhash is compared to determine a visiting frequency for each device represented in the generated minhash. Finally, the process of determining a visiting frequency for each device in a generated minhash using the table of minhashes and determining a relative size (proportion) of the devices (detected at the site over a given period of time) having different visiting frequencies associated therewith are described with reference to FIG. 5.

Figure 3:
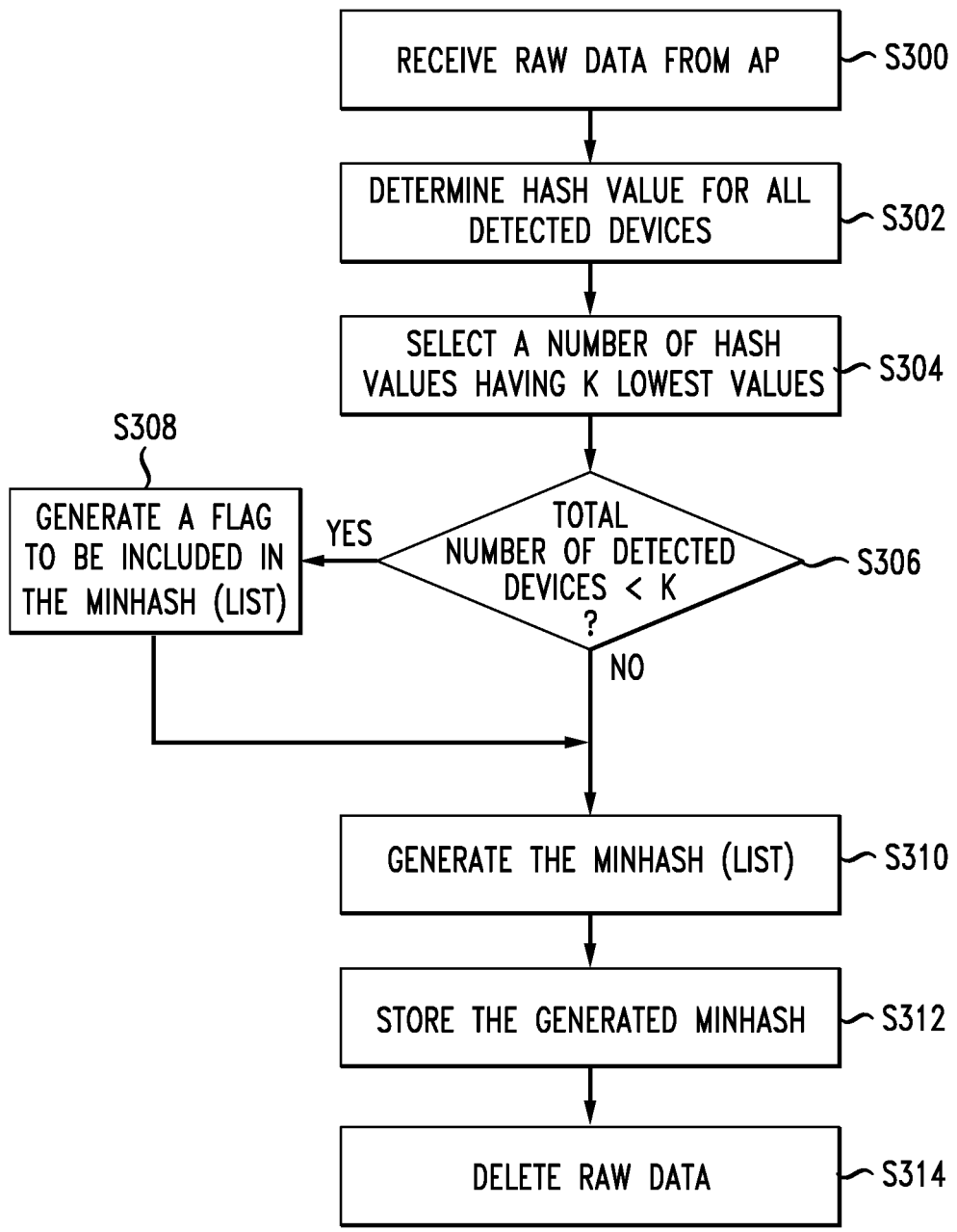
FIG. 3 illustrates a process of generating a minhash based on raw data representing devices detected at a site, according to an aspect of this disclosure.

FIG. 3 illustrates a process of generating a minhash based on raw data representing devices detected at a site, according to an aspect of this disclosure. While FIG. 3 will be described from the perspective of processing system 110 of FIG. 1, it is readily understandable that processor 110-1 of processing system 110 executes a series of computer-readable instructions stored in memory 110-2 in order to perform the functions described with reference to FIG. 3.

At S300, processing system 110 receives raw data from AP 104. The reception of such raw data can be through an exchange of wireless signals between one or more electronic devices such as the electronic devices 106-1 to 106-3 and the AP 104. For example, every time AP 104 detects an electronic device (e.g., one of electronic devices 108-1, 108-2 and/or 108-3) at site 102 over a minimum time period of interest (as defined above, which may also be referred to as the current minimum time period of interest), AP 104 sends raw data (e.g., MAC address, any other type of network address, a device type, etc.) of the detected device to processing system 110. As mentioned above, the minimum time period of interest over which AP 104 detects the presence of electronic devices and sends the corresponding raw data to processing system 110, is a minimum time period over which a provider or an operator of the site 102 wants to obtain an estimate of a proportion of various visiting frequencies among all devices detected at site 102. For example, a provider may want to determine statistics on how many of the devices detected at site 102 over any given hour are hourly devices, daily devices, weekly devices, monthly devices, quarterly devices, semi-annual devices, annual devices, occasional devices, or first-timer devices.

Accordingly, the minimum time period of interest is set to have duration of one hour (60 minutes). Another provider may want to determine the same statistic over any given day. Accordingly, the minimum time period of interest is set to a duration of one day (24 hours, for example from 12:00 AM to 11:59 PM).

The raw data received at the processing system 110 for each device can include various types of identifiers for the corresponding device, including but not limited to, the device's MAC address, manufacturer ID, type ID, etc.

At S302 and upon reception of the raw data for devices detected by AP 104 over the minimum time period of interest, processing system 110 determines hash values for all the detected devices by determining a hash value of each device's identifier (e.g., MAC address). While MAC address is described here as a particular example of the identifier used to generate a hash value for a device, inventive concepts are not limited thereto and other types of identifier (e.g., network address) can also be used to generate hash values. For example, in the context of applying the present disclosure to virtual sites such as websites, the identifier can be a network address. If a site is a highway toll station, the identifier can be license plate numbers of vehicles.

Any (known or to be developed) hash function can be used to generate the above described hash values. However, regardless of the used hash function, the same hash function is consistently used by processing system 110 to generate other hash values.

At S304, processing system 110 selects a number of the generated hash values having the smallest values among the generated hash values to generate a minhash for the devices detected at site 102 over the minimum time period of interest. The number of selected devices is equal to a threshold value (i.e., the variable k described above). As described above, k can take on any positive value and as the value of k increases, the accuracy of the estimation process increases. k is a configurable parameter that can be determined based on experiments and empirical studies. For example, when k is set equal to 5000, at S304, processing system 110 selects 5000 of the generated hash values that have the smallest values among all of the hash values of all the devices detected at site 102 over the time period.

In one example, the value of k can differ from one generated minhash to another, from minhashes in one minhash category of a table, which will be described below, to another, etc. Furthermore, minhashes with variable values of k can be merged and used to carry out examples and functionalities described herein.

At S306, processing system 110 determines if the total number of devices detected at site 102 over the minimum time period of interest is less than the value of the threshold value (i.e., k). If at S306, processing system 110 determines that the total number of devices detected at site 102 over the minimum time period of interest is less than the threshold value then at S308, processing system 110 generates a flag and includes the same in the generated minhash. However, if processing system 110 determines that the total number of devices detected at site 102 over the minimum time period of interest is equal to greater than the threshold value, then the process proceeds to S310.

At S310, processing system 110 generates a minhash (list) for the devices detected at site 102 over the given time period, where the elements of the minhash are the hash values selected at S306.

Figure 4:
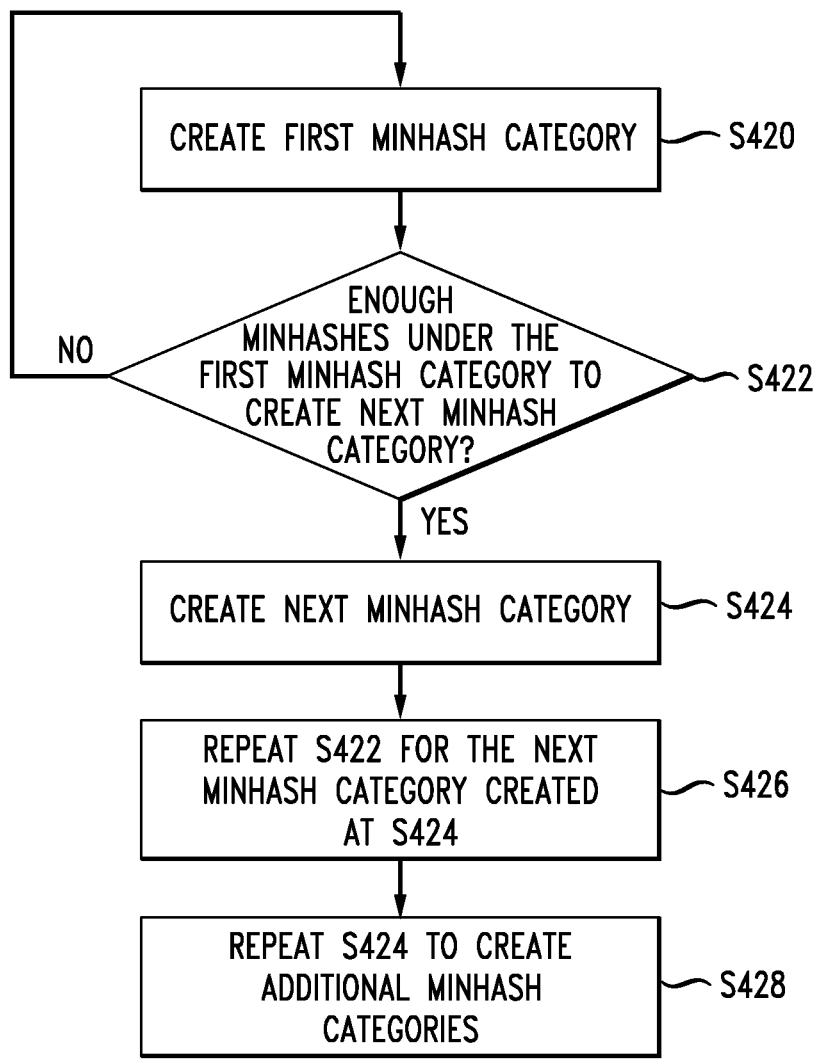
FIG. 4 illustrates a process of generating a table of minhash values, according to an aspect of this disclosure.

At S312, processing system 110 stores the generated minhash in the table of minhashes (which will be further described below with reference to FIG. 4).

At S314, processing system 110 deletes the raw data received at S300. Accordingly and as described above, example embodiments described herein allow processing system 110 to store only the raw data for devices detected at site 102 over the current minimum time period of interest, which is significantly less compared to existing methods where the raw data for all devices must be maintained and stored in a memory, up to the longest period of time over which distributions of visiting frequencies are to be determined.

Having described the generation of a minhash (a list) for devices detected at a site over a minimum time period of interest, the disclosure now turns to the discussion of generating a table, against which each of the hash values in the generated minhash is to be compared to determine a corresponding visiting frequency for each of the hash values and subsequently a distribution of visiting frequencies among devices detected at a site over the minimum time period of interest. However, prior to describing the generation of the table, a couple of related terms will be defined.

A table may have one or more minhash categories. Each minhash category corresponds to each time period, defined above. For example, an hourly minhash category corresponds to the one-hour time period. All minhashes generated for all time periods equal to the one-hour time period, are stored in the table under the hourly minhash category. Furthermore, an hourly visiting frequency described above is determined, for each device detected over the current one-hour time period, based on all minhashes stored in the table under the hourly minhash category. Similarly, the table can include further minhash categories corresponding to other time periods (e.g., daily minhash category, weekly minhash category, monthly minhash category, quarterly minhash category, semi-annual minhash category, annual minhash category, etc.).

Another characteristic of the table is that only the minhash category corresponding to the minimum time period of interest (e.g., the hourly minhash category or the daily minhash category), is generated based on actual raw data collected over multiple time periods equal to the minimum time period of interest. Any further minhash under other minhash categories is solely generated based on minhashes in the immediately preceding minhash category. For example, any weekly minhash generated under the weekly minhash category, is solely generated based on the 7 previous daily minhashes under the daily minhash category (therefore, raw data corresponding to all devices detected at site 102 over an entire week, need not be stored), a monthly minhash under the minhash category is solely generated based on 4 previous weekly minhashes under the weekly minhash category (therefore, raw data corresponding to all devices detected at site 102 over an entire month, need not be stored), etc.

Having described some of the characteristics of the table, the discussion now turns to the generation of such table. FIG. 4 illustrates a process of generating a table of minhash values, according to an aspect of this disclosure.

At S420, processing system 110 creates a first minhash category corresponding to the minimum time period of interest (first time period described above). For example, if the minimum time period of interest is one hour (hourly), at S420, processing system 110 creates an hourly minhash category described above. Processing system 110 continuously populates the hourly minhash category by generating an hourly minhash for each one-hour time period, as described above with reference to FIG. 3. So for example, if a provider is interested in obtaining distribution of each visiting frequency among devices detected at site 102, every 1-hour starting from 8:00 AM until 11:00 PM, processing system 110 generates an hourly minhash, as described above with reference to FIG. 3, for all devices detected at site 102 from 8:00 AM to 9:00 AM followed by another hourly minhash for all devices detected at site 102 from 9:00 AM to 10:00 AM, etc., until the last hourly minhash for all devices detected at site 102 from 10:00 PM to 11:00 PM.

Similarly, if the minimum period of interest is daily, processing system 110 generates the first minhash category to be the daily minhash category, where every day (where the duration of the day is a configurable duration defined, for example to span 24 hours (12:00 AM to 11:59 PM), from opening to close every business day (e.g., 8:00 AM to 9:00 PM, etc.)).

Thereafter, at S422, processing system 110 determines if enough minhashes are created and stored under the first minhash category in order to create the next minhash category. For example, assuming that 24 distinct hourly minhashes are needed to determine a single daily minhash then at S422, processing system 110 determines if at least 24 distinct hourly minhashes are stored under the hourly minhash category. As another example, assuming that 7 distinct daily minhashes are needed to determine a single weekly minhash, then at S422, processing system 110 determines if at least 7 distinct daily minhashes are stored under the daily minhash category in order to create a single weekly minhash. The same concept applies to any type of first minhash category and generation of the subsequent category.

In another example, instead of determining a single daily minhash based on every 24 distinct hour minhashes, processing system 110, at the end of each 24 hour period (e.g., at 11:59 PM each day) generates a daily minhash based on all hourly minhashes generated over the past 24 hours (regardless of the actual number of distinct hourly minhashes generated over the past hour, which may be fewer than 24 due to, for example, a system failure, power outage, etc.). Similarly, instead of determining a single weekly minhash based on 7 distinct daily minhashes, processing system 110, at the end of a week long period (depending on how the week long period is defined, e.g., Monday to Monday, Tuesday to Tuesday, etc.), generates a single weekly minhash based on the available daily minhashes generated over the last week (7-days), regardless of the number of distinct daily minhashes generated during the same period.

If at S422, processing system 110 determines enough minhashes are not stored (do not yet exist) under the first minhash category, the process reverts back to S420, where processing system 110 continues to populate the first minhash category by generating and storing additional minhashes corresponding to the minimum time period of interest under the first minhash category.

However, if at S422, processing system 110 determines that enough minhashes are stored under the first minhash category, processing system 110, at S424, creates the next minhash category based on minhashes stored under the first minhash category. Again, if for example, the first minhash category is the hourly minhash category, then at S424, processing system 110 generates a single daily minhash based on all 24 distinct hourly minhashes. Similarly, if the first minhash category is the daily minhash category, then at S424, processing system 110 generates a single weekly minhash under the weekly minhash category, based on all 7 distinct daily minhashes.

In one example, processing system 110 generates each minhash under the next minhash category by merging a number of minhashes in the previously created minhash category. In the example described above, processing system 110 generates a single daily minhash by merging 24 distinct hourly minhashes or generates a single weekly minhash by merging 7 distinct daily minhashes. As described above, when two or more minhashes are merged, only those hash values that are common between the two or more minhashes appear in the merged minhash.

Having created the first minhash category and the subsequent minhash category as described with reference to S420 to S424, at S426 and S428, processing system 110 repeats a similar processor as described with reference to S422 and S424 to create additional minhash categories comprising one or more minhashes, wherein each minhash under any of the additional minhash categories is generated based only on one or more minhashes under an immediately preceding minhash category. For example, assuming that the hourly minhash category is the first minhash category, at S426, processing system 110 determines if enough daily minhashes exist under the daily minhash category to generate weekly minhash categories, and if processing system 110 determines that enough daily minhashes exist under the daily minhash category, then at S428, processing system 110 generates a single weekly minhash based on 7 distinct daily minhashes. The same process applies to generate a single monthly minhash from 4 distinct weekly minhashes, a single quarterly minhash from 3 distinct monthly minhashes, a single semi-annual minhash from two quarterly minhashes (or a single semi-annual from 6 distinct monthly minhashes if for example, no quarterly category exists), a single annual minhash from 2 distinct semi-annual minhashes, etc.

The process of generating the table, as described with reference to FIG. 4 may be continuously performed (e.g., as long as a provider is interested in obtaining statistics on visiting frequencies of devices detected at site 102, etc.).

Having described how a single minhash is generated (FIG. 3) and how a table is generated (FIG. 4), the description now turns to FIG. 5, which describes an example process of determining a visiting frequency for devices represented in a minhash generated over a time period and subsequently a distribution of each visiting frequency among all devices detected at a site over the time period, according to an aspect of this disclosure.

At S550, processing system 110 generates a minhash (a list) for all devices detected (through an exchange of wireless signals between the devices and AP 104, as described above) at site 102 over a current minimum time period of interest (first time period), which in examples described above include a one-hour time period or a one-day time period. However, the described minimum time periods of interest are non-limiting. As mentioned, the generated minhash at S550 represents a portion of all devices detected at site 102 over the current minimum time period of interest (i.e., those detected devices, for which corresponding hash values are among the k lowest hash values of all devices detected at site 102).

Collectively at S552 and S554, processing system 110 determines a visiting frequency for each device represented in the minhash (list) generated at S550 (i.e., for each device having a corresponding hash value in the generated minhash). Processing system 110 determines such visiting frequency as follows.

For each hash value in the generated minhash at S550, processing system 110, at S552, searches the first minhash category to determine if a number of times (number of appearances) that the hash value appears in the first minhash category (i.e., the minhash category corresponding to the minimum time period of interest) meets a qualifying condition (described above). For example, if a qualifying condition for a device to be considered as having an hourly visiting frequency is that the device must appear in at least 3 out of the last 5 distinct hourly minhashes, then at S552, processing system 110 searches the last 5 minhashes stored under the hourly minhash category to determine if the hash value appears at least 3 times in the last 5 minhashes.

If the number of appearances satisfies the qualifying condition for first minhash category, then at S554, processing system 110 associates the corresponding device with that visiting frequency. For example, if the number of appearances of a given hash value that appears in the generated list, is equal to or greater than 3 (which is the qualifying condition for a device to be associated with the hourly visiting frequency), then at S554, processing system 110 associates the corresponding device with the hourly visiting frequency.

Thereafter, at S556, processing system 110 terminates the searching and the associating processes of S552 and S554 for that specific hash value and proceeds to S560, which will be further described below. In other words, as soon as a device is associated with one visiting frequency, the same device will not be associated with any other visiting frequency.

However, if at S552, processing system 110 determines that the number of appearances of the hash value in the first minhash category does not meet a corresponding qualifying condition, then at S558, processing system 110 moves to the next available minhash category in the table (the table generated according to FIG. 4) and repeats S552, S554 and S556 with respect to the next available minhash category in order to determine if the device corresponding to the hash value can be associated with a visiting frequency corresponding to the next available minhash category.

For example, after performing S552, S554 and S556 with respect to one hash value present in the list generated at S550, processing system 110 determines that the corresponding device cannot be associated with the hourly visiting frequency, then at S558, processing system 110 proceeds to the daily minhash category and repeats S552 to S556. In doing so, processing system 110 determines if the hash value satisfies a qualifying condition for the corresponding device to be associated with the daily visiting frequency (e.g., does the hash value appear at least 4 times in the last 7 distinct daily minhashes). If the hash value satisfies the qualifying condition for association with the daily visiting frequency, processing system 110 associated the device with the daily visiting frequency and if not, processing system 110 repeats S520 to S556 for each remaining minhash category (e.g., monthly, quarterly, semi-annual, annual, etc.). If, after exhausting each available minhash category, processing system 110 is unable to associate the hash value with any visiting frequency, then processing system 110 associates the corresponding device with a "first-timer" visiting frequency.

Performing processes S552 and S554 entails searching every available minhash under the corresponding minhash category in order to determine if a particular device can be associated with a corresponding visiting frequency or not.

In an alternative embodiment, processing system 110 merges a number of minhashes under each minhash category and then determines a visiting frequency for each device by comparing the corresponding hash value with only hash values appearing in the merged minhash category.

For example, assuming that a qualifying condition for the hourly visiting frequency is for a hash value to appear at least 3 times in the last 5 distinct hourly minhashes, processing system 110 merges the last 5 distinct hourly minhashes, where the resulting merged minhash includes only hash values that appear at least 3 times in the last 5 distinct hourly minhashes. Accordingly, when determining a number of appearances of a hash value that exists in the list generated at S550, processing system 110 only compares the hash value of the generated list to hash values present in the merged minhash and when a match exists for the hash value of the generated list, processing system 110 associates the corresponding device with the hourly visiting frequency.

Processing system 110 can generate similar merged minhashes for other minhash categories as well (e.g., merging last 7 distinct daily minhashes to include only minhashes that appear at least 5 times out of the last 7 distinct daily minhashes, when the qualifying condition for a daily visiting frequency is for a minhash to appear at least 5 times in the last 7 distinct daily minhashes).

At S560, processing system 110 determines if the process of determining a visiting frequency has been performed for all hash values present in the list generated at S550. If processing system 110 determines that more hash values in the list exist for which a visiting frequency has not yet been determined, the process reverts back to S552 and processing system 110 repeats S552 to S558 with respect to each remaining hash value in the list generated at S550. However, if at S560, processing system 110 determines that a visiting frequency has been determined for all hash values present in the list generated at S550, then at S562, processing system 110 determines (estimate) a distribution of each visiting frequency among all devices detected at site 102 over the current minimum time period of interest (first time period).

In one example, processing system 110 determines the distribution of each visiting frequency among all devices detected at site 102 over the minimum time period of interest, by determining a distribution of each visiting frequency among all devices represented in the list generated at S550. For example, if the list includes only 5 hash values for 5 devices and three of the 5 devices are associated with the daily visiting frequency, one device is associated with the hourly visiting frequency and one device is associated with the weekly visiting frequency, then processing system 110 determines that 60% (3 out of 5) of all the devices detected at site 102 over the current minimum time period of interest are daily devices (have daily visiting frequency), 20% (1 out of 5) of all devices detected at site 102 over the current minimum time period of interest are hourly devices (have hourly visiting frequency) and 20% (1 out of 5) of all devices detected at site. 102 over the current minimum time period of interest are weekly devices (have hourly visiting frequency).

Thereafter, at S564, processing system 110 stores the visiting frequencies and the distributions of each visiting frequency among devices detected at site 102 over the current minimum time period of interest for further processing. Examples of such further processing include, but is not limited to, providing the stored distributions to providers for targeting advertisements, discounts, promotions, etc.

In one example, when processing system 110 generates the list at S550, processing system 110 also stores (collects) various metadata together with each generated hash value represented in the list. Examples of such metadata include a device identifier, a manufacturer identifier, an average length of visit, a number of times the device corresponding to each hash value was detected at site 102 during the same current minimum time period of interest, etc. However, other types of metadata are also contemplated and within the scope of the present disclosure.

Therefore, it is also possible to determine various statistics for each visiting frequency based on the stored metadata. For example, processing system 110 can determine an average length of visiting for the daily visiting frequency by determining an average of all visiting lengths stored together with all hash values in the list generated at S550 that are associated with the daily visiting frequency. As another example, if 50% of all hash values associated with the daily visiting frequency have stored metadata that indicates the devices are manufactured by a particular mobile manufacturer, then processing system 110 estimates that 50% of daily devices are mobile devices manufactured by the particular mobile manufacturer.

Figure 5:
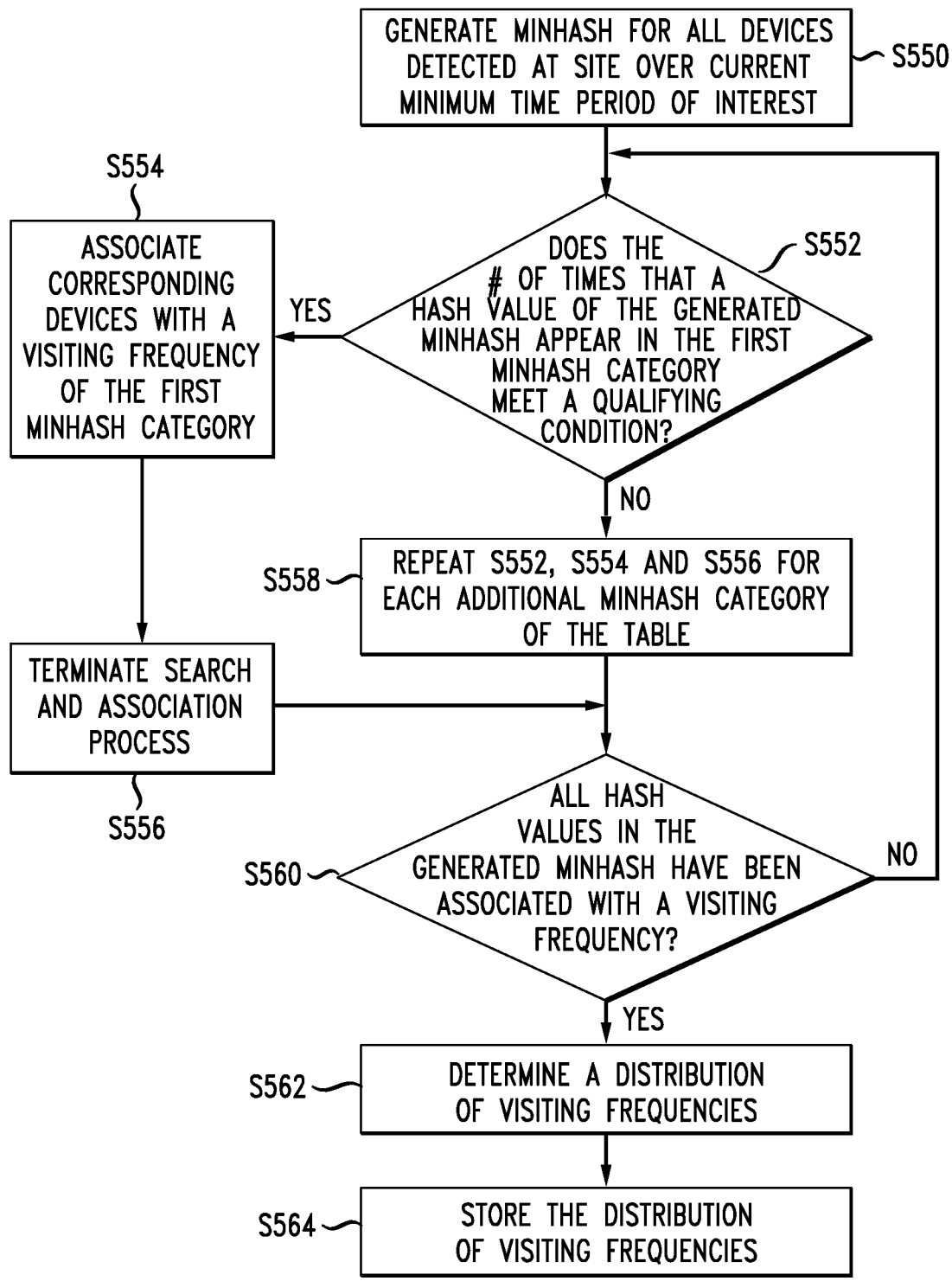
FIG. 5 describes the process of determining a visiting frequency for devices represented in a minhash generated over a time period and subsequently a distribution of each visiting frequency among all devices detected at a site over the time period, according to an aspect of this disclosure.

FIGS. 6A-B provide examples of implementing the method of FIG. 5, according to an aspect of the present disclosure. With reference to FIG. 6A, it is assumed that the above-described table includes a single minhash category (daily minhash category) with the minimum time period of interest set to 1 day (e.g. 24 hours) and k set to 5. Furthermore, it is assumed that the current time period is a Monday.

As shown in FIG. 6A, the table includes minhashes 670 to 682 (MH(MON), . . . MH (SUN)), which have been generated for every single one of the past 7 days (7 days prior to the current time period of Monday). Each of the minhashes 670 to 682 include the lowest 5 hash values among hash values of all devices detected at site 102 over each of the past 7 days.

Furthermore, FIG. 6A shows a minhash 684 for the current time period of Monday. The minhash 684 is the minhash created at S550. For every hash value present in the minhash 684, at S552, processing system 110 determines if each hash value is present in at least 5 of the minhashes 670 to 682 (this is the qualifying condition for a device to be associated with the daily visiting frequency). For example, processing system 110 determines if "1" appears at least 5 times among minhashes 670 to 682. In this example of FIG. 6A, "1" appears 5 times among minhashes 670 to 682. Accordingly, the outcome of the decision at S552 is yes and thus the process proceeds to S554, where processing system 110 associates the electronic device corresponding to the hash value "1" with the daily visiting frequency. Thereafter, at S556, processing system 110 terminates the process with respect to "1", since a visiting frequency has already been associated with an electronic device corresponding the hash value "1". Next, at S560, processing system 110 determines that there are more hash values present in the minhash 684 to be associated with a visiting frequency. Accordingly, the process reverts back to S552 and processing system 110 repeats S552 to S556 for remaining hash values in the minhash 684 (hash values 8, 20, 33 and 50, as shown in 684).

Similar to the hash value "1", hash value "20" also appears at least 5 times among minhashes 670 to 682. Accordingly, electronic devices corresponding to hash value "20" is also associated with the daily visiting frequency by processing system 110. However, hash values "8" and "33" do not meet the qualifying condition for association with the daily visiting frequency because they do not appear at least 5 times among minhashes 670 to 682.

With respect to minhashes "8" and "33", the outcome of the decision at S552 is negative and thus processing system 110 performs S558, with respect to each of the hash values "8" and "33". That is, processing system 110 proceeds to check other minhash categories of the table to determine if any of the hash values "8" and "33" can be associated with any other visiting frequency. Given that in the particular example of FIG. 6A, the table includes no other minhash category, processing system 110 associates electronic devices corresponding to hash values "8" and "33" with the "non-daily" visiting frequency (which may also be referred to as "first-timer" visiting frequency).

Accordingly, among devices represented in the minhash 684, 2 are associated with the daily visiting frequency while two are associated with the "non-daily" visiting frequency. With respect to the hash value "50" of minhash 684, processing system 110 ignores "50" because, unknown to processing system 110, the electronic device associated with "50" could have also appeared on Monday, Tuesday and Saturday but failed to appear the corresponding minhashes (MH 670, MH 672 and MH 680, respectively) since the daily minhashes for Monday, Tuesday and Saturday only go up to a number that is less than "50" (unless a flag was generated and included in each of MH 670, 672 and 680, as described above, indicating that MHs 670, 672 and 680 are complete). Accordingly and with "50" not being considered, processing system 110 determines that 50% (2 out of 4) of all devices detected at site 102 over the current time period of Monday, are daily devices, while the remaining 50% (2 out of 4) are non-daily devices.

As described above with reference to FIG. 5, instead of searching every single one of the minhashes 670 to 682, processing system 110 can merge minhashes 670 to 682, such that the resulting minhash includes only hash values that appear at least 5 times among minhashes 670 to 682. The resulting merged minhash is the minhash 686 shown in FIG. 6A. As shown, minhash 686 only includes hash values "1", "20" and "42", each of which appears at least 5 times among minhashes 670 to 682.

Accordingly and for purposes of performing S552 to S556, processing system 110 compares each hash value of the minhash 684 with only hash values present in the merged minhash 686 and since only minhashes "1" and "20" are common between minhash 684 and 686, processing system 110 associates electronic devices corresponding to hash values "1" and "20" with the daily visiting frequency.

As described above, processing system 110 can collect various types of metadata corresponding to devices represented in each minhash. FIG. 6B illustrates an example, where the metadata is the number of visits by each electronic device represented in each of the minhashes 670 to 684 during the corresponding 1-day time period. For example, metadata table 670-1 includes the number of visits of each of the electronic devices represented in the minhash 670 during the corresponding 1-day time period of Monday. Metadata tables 672-1 to 684-1 provide the same metadata for corresponding one of the minhashes 672 to 684.

Accordingly, it is possible for processing system 110 to determine an average number of visits for daily devices over the last 8 days (the current time period of Monday plus the previous 7 days). For example, processing system 110 determines that the total number of visits by daily devices during the current time period of Monday is 4 (3 times by the electronic device corresponding to hash value "1" and 1 time by the electronic device corresponding to hash value "20"). Similarly, processing system 110 can determine the total number of visits by electronic devices corresponding to hash values "1" and "20" over the previous 7 days, by either referencing the individual metadata tables 6701- to 682-1 or the metadata table 686-1 corresponding to the merged minhash 686.

From the metadata table 686-1, processing system 110 determines that the total number of visits by the daily devices over the previous 7 days is 37. Therefore, processing system 110 can determine the average number of visits by daily devices over the last 8 days to be 5.125 times per day (determined by the sum of 37 and 4, which is then divided by 8).

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
   detecting a plurality of handheld electronic devices at a site over a first time period via wireless signals transmitted by the plurality of handheld electronic devices and received at an access point of the site;
   in response to detecting the plurality of handheld electronic devices at the site over the first period of time, generating, for each of the plurality of handheld electronic devices, a minhash including a hash value for each identifier of the plurality of handheld electronic devices;
   for each minhash category having a visiting frequency of a plurality of minhash categories:
      determining, for each hash value in the minhash, whether a number of times that the hash value appears in a merged minhash of the minhash category of the plurality of minhash categories meets a qualifying condition, wherein the merged minhash includes merging a number of minhashes in the minhash category; and
      in response to meeting the qualifying condition, associating the corresponding handheld electronic device of the plurality of handheld electronic devices to the hash value with the visiting frequency of the minhash category;
   in response to associating the hash values in the minhash with the visiting frequencies of the plurality of minhash categories, estimating a distribution of the visiting frequencies; and
   storing the distribution of the visiting frequencies.

2. The method of claim 1, wherein the first time period is a shortest time period over which detection of the devices at the site is desired.

3. The method of claim 1, further comprising:
   establishing a plurality of minhash categories by:
      creating a first minhash category with a plurality of minhashes generated over a time period equal to the first time period, and
      creating additional minhash categories with the plurality of minhashes, wherein one or more of the plurality of minhashes is generated based on one or more others of the plurality of minhashes under an immediately preceding one of the additional minhash categories.

4. The method of claim 3, wherein each of the additional minhash categories is associated with a single visiting frequency such that the associating is based on minhashes under one of the minhash categories.

5. The method of claim 1, wherein the estimating of the distribution includes:
   for each of the plurality of visiting frequencies:
      determining, for a given visiting frequency, a number of the devices having the given visiting frequency; and
      determining, for the given visiting frequency, a ratio of the number to a total number of the plurality of handheld electronic devices, the ratio representing a distribution of the given visiting frequency among devices detected at the site over the first time period.

6. The method of claim 1, further comprising:
   collecting one or more metadata types for each of the plurality of handheld electronic devices; and
   determining at least one statistic for each visiting frequency over the first time period based on the one or more metadata types collected for one or more of the plurality of handheld electronic devices in the minhash.

7. A non-transitory computer readable storage media storing instructions which when executed by a processor on a system cause the system to perform operations comprising:
  detecting a plurality of handheld electronic devices at a site over a first time period via wireless signals transmitted by the plurality of handheld electronic devices and received at an access point of the site;
  in response to detecting the plurality of handheld electronic devices at the site over the first period of time, generating, for each of the plurality of handheld electronic devices, a minhash including a hash value for each identifier of the plurality of handheld electronic devices;
  for each minhash category having a visiting frequency of a plurality of minhash categories:
    determining, for each hash value in the minhash, whether a number of times that the hash value appears in a merged minhash of the minhash category of the plurality of minhash categories meets a qualifying condition, wherein the merged minhash includes merging a number of minhashes in the minhash category; and
    in response to meeting the qualifying condition, associating, the corresponding handheld electronic device of the plurality of handheld electronic devices to the hash value with the visiting frequency of the minhash category;
  in response to associating the hash values in the minhash with the visiting frequencies of the plurality of minhash categories, estimating a distribution of the visiting frequencies; and
  storing the distribution of the visiting frequencies.

8. The non-transitory computer readable storage media of claim 7, wherein the first time period is a shortest time period over which detection of the devices at the site is desired.

9. The non-transitory computer readable storage media of claim 7, further comprising:
  establishing a plurality of minhash categories by:
    creating a first minhash category with a plurality of minhashes generated over a time period equal to the first time period, and
    creating additional minhash categories with the plurality of minhashes, wherein one or more of the plurality of minhashes is generated based only on one or more others of the plurality of minhashes under an immediately preceding one of the additional minhash categories.

10. The non-transitory computer readable storage media of claim 9, wherein each of the additional minhash categories is associated with a single visiting frequency such that the associating is based on minhashes under one of the minhash categories.

11. The non-transitory computer readable storage media of claim 7, wherein the estimating of the distribution includes:
  for each of the plurality of visiting frequencies:
    determining, for a given visiting frequency, a number of the devices having the given visiting frequency;
    determining, for the given visiting frequency, a ratio of the number to a total number of the plurality of handheld electronic devices, the ratio representing a distribution of the given visiting frequency among devices detected at the site over the first time period.

12. The non-transitory computer readable storage media of claim 7, the operations further comprising:
  collecting one or more metadata types for each of the plurality of handheld electronic devices; and
  determining at least one statistic for each visiting frequency over the first time period based on the one or more metadata types collected for one or more of the plurality of handheld electronic devices in the minhash.

13. A system, comprising:
  a non-transitory computer readable memory storing instructions;
  a processor programmed to cooperate with the instructions in memory to perform operations which when executed cause the system to perform operations comprising:
    detecting a plurality of handheld electronic devices at a site over a first time period via wireless signals transmitted by the plurality of handheld electronic devices and received at an access point of the site;
    in response to detecting the plurality of handheld electronic devices at the site over the first period of time, generating, for each of the plurality of handheld electronic devices, a minhash including a hash value for each identifier of the plurality of handheld electronic devices;
    for each minhash category having a visiting frequency of a plurality of minhash categories:
      determining, for each hash value in the minhash, whether a number of times that the hash value appears in a merged minhash of the minhash category of the plurality of minhash categories meets a qualifying condition, wherein the merged minhash includes merging a number of minhashes in the minhash category; and
      in response to meeting the qualifying condition, associating the corresponding handheld electronic device of the plurality of handheld electronic devices to the hash value with the visiting frequency of the minhash category;
    in response to associating the hash values in the minhash with the visiting frequencies of the plurality of minhash categories, estimating a distribution of the visiting frequencies; and
    storing the distribution of the visiting frequencies.

14. The system of claim 13, wherein the first time period is a shortest time period over which detection of the devices at the site is desired.

15. The system of claim 13, further comprising:
  establishing a plurality of minhash categories by:
    creating a first minhash category with a plurality of minhashes generated over a time period equal to the first time period, and
    creating additional minhash categories with the plurality of minhashes, wherein one or more of the plurality of minhashes is generated based only on one or more others of the plurality of minhashes under an immediately preceding one of the additional minhash categories.

16. The system of claim 15, wherein each of the additional minhash categories is associated with a single visiting frequency such that the associating is based on minhashes under one of the minhash categories.

17. The system of claim 13, wherein the estimating of the distribution includes:
  for each of the plurality of visiting frequencies:
    determining, for a given visiting frequency, a number of the devices having the given visiting frequency;
    determining, for the given visiting frequency, a ratio of the number to a total number of the plurality of handheld electronic devices, the ratio representing a distribution of the given visiting frequency among devices detected at the site over the first time period.

18. The system of claim 13, the operations further comprising:
    collecting one or more metadata types for each of the plurality of handheld electronic devices; and
    determining at least one statistic for each visiting frequency over the first time period based on the one or more metadata types collected for one or more of the plurality of handheld electronic devices in the minhash.

* * * * *